July 19, 1966    J. J. KAPLAN ET AL    3,261,054
AUTOMATIC LEG BONING MACHINE AND SYSTEM
Filed March 19, 1964    5 Sheets-Sheet 1

John J. Kaplan
William R. Kaplan    INVENTORS

BY *Clarence A. O'Brien*
*and Harvey B. Jacobson*
Attorneys

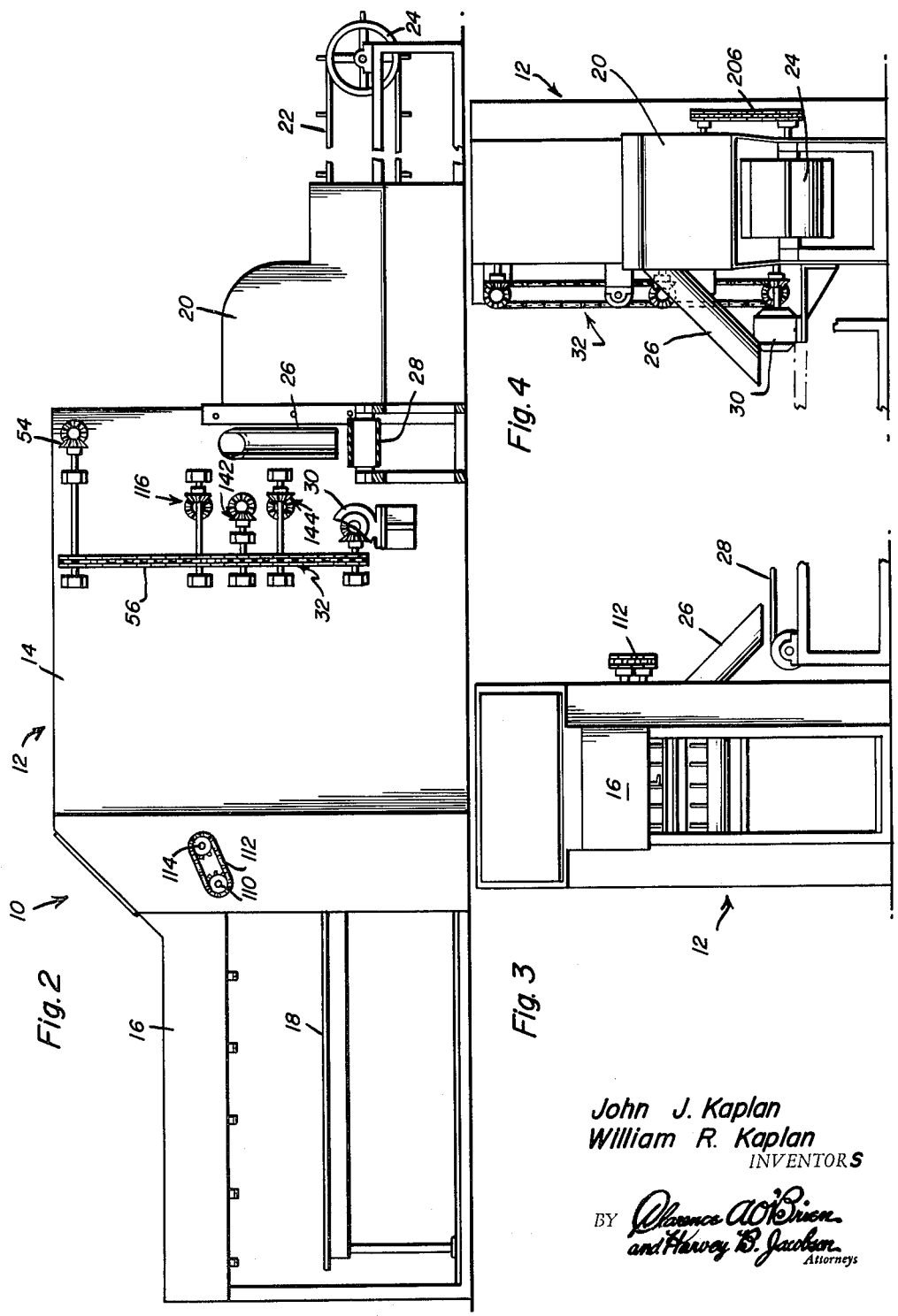

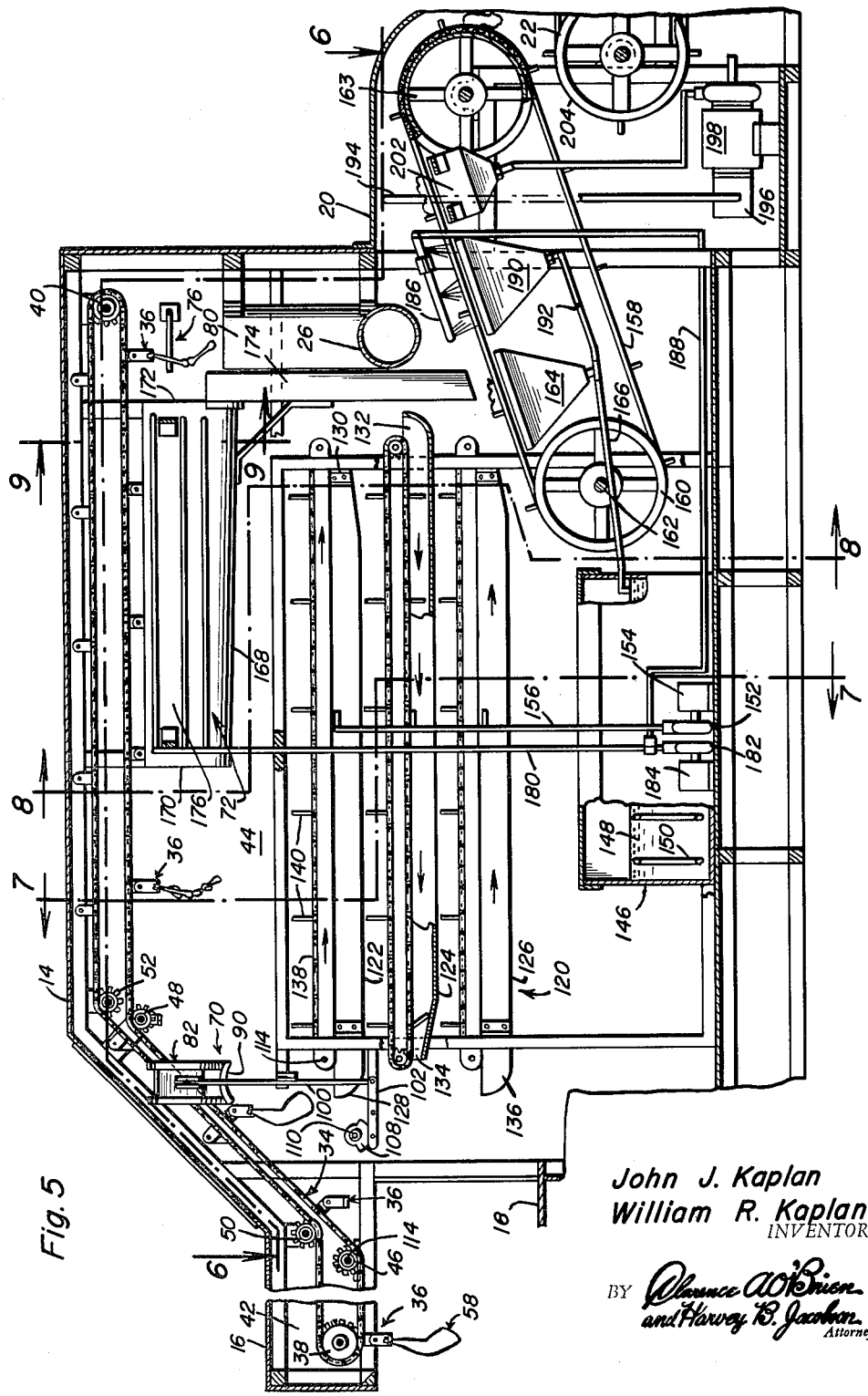

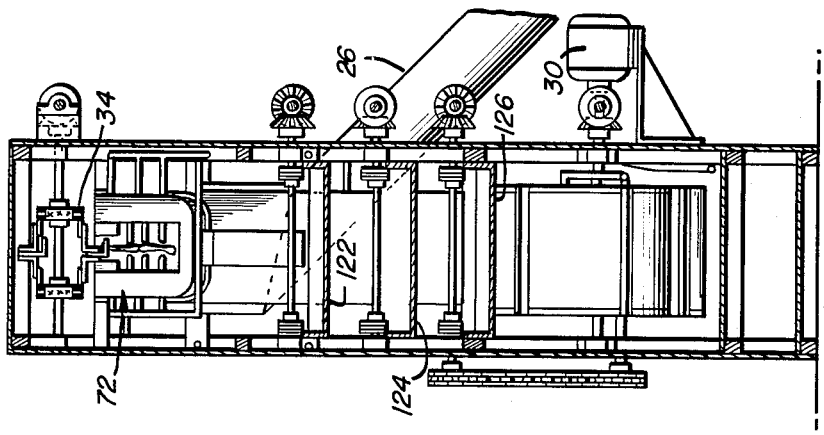
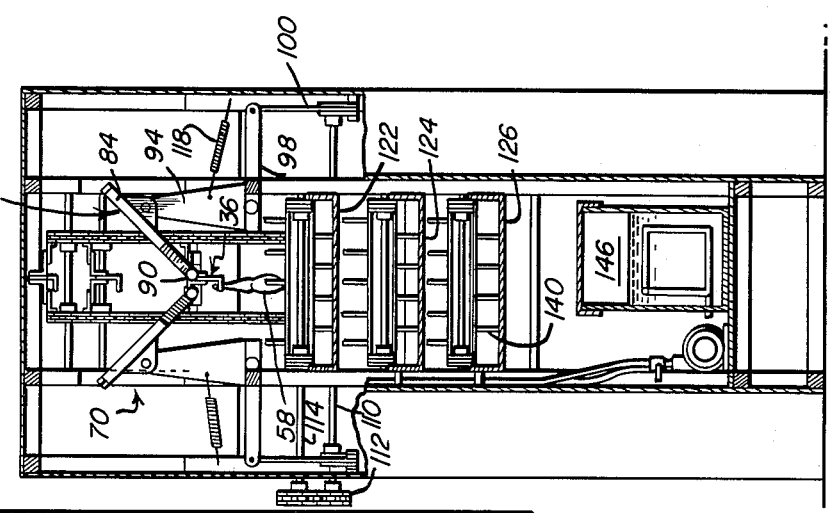
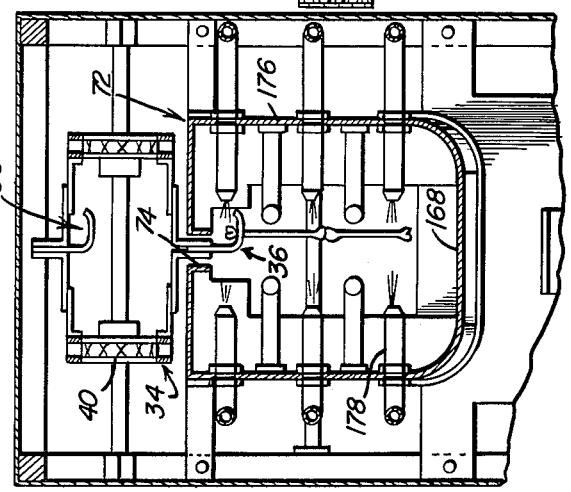
John J. Kaplan
William R. Kaplan
INVENTORS

July 19, 1966  J. J. KAPLAN ET AL  3,261,054
AUTOMATIC LEG BONING MACHINE AND SYSTEM
Filed March 19, 1964  5 Sheets-Sheet 5
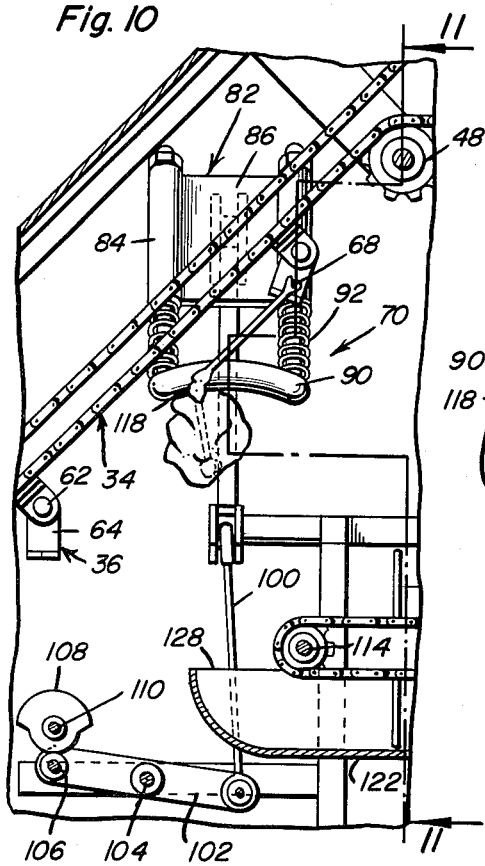
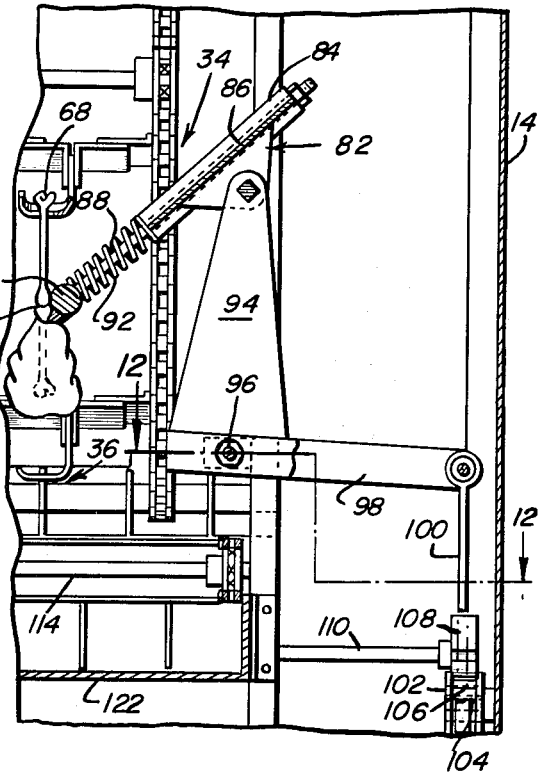
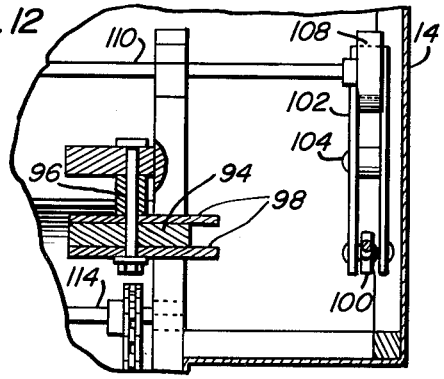
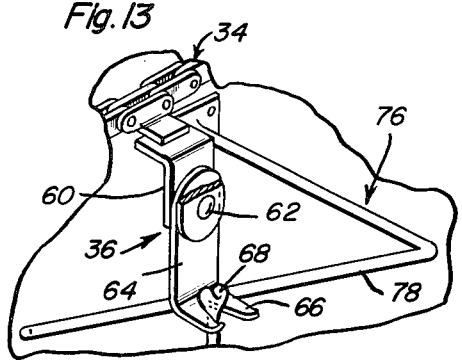
John J. Kaplan
William R. Kaplan
INVENTORS

United States Patent Office 3,261,054
Patented July 19, 1966

3,261,054
AUTOMATIC LEG BONING MACHINE AND SYSTEM
John J. Kaplan and William R. Kaplan, Omaha, Nebr., assignors to Campbell Soup Company, Camden, N.J., a corporation of New Jersey
Filed Mar. 19, 1964, Ser. No. 353,180
11 Claims. (Cl. 17—11)

This invention relates to the processing of poultry and more particularly to the boning or removal of meat from poultry legs.

The present invention therefore involves a new and useful machine and system for removal of meat from the leg portion of poultry. The leg portion to which the machine and method of the present invention applies, is that part of the animal which extends from the trunk or main body to the foot and thus includes both the thigh and leg attached thereto by a knuckle joint. The animal referred to of course includes domestic fowl, chickens, turkeys, ducks, geese, etc.

As one of the important objects of the present invention, removal of meat from the poultry legs is achieved in a more effective and rapid manner so as to obtain a product in pieces of larger bulk and more desirable appearance. The commercial value of the product and its value for further processing purposes, is thereby enhanced.

An additional object of the present invention is to provide apparatus for removal of meat from the poultry leg bones in the effective manner aforementioned yet without breaking or splintering of the bones to thereby reduce the hazard of bone fragments in the final product.

A still further object of the present invention is to provide apparatus to process cooked poultry leg bones so as to more rapidly remove the meat therefrom and chill the stripped meat so as to reduce bacterial contamination and process a larger volume of meat more rapidly with a resultant savings in labor and operational costs.

In accordance with the foregoing objects, the machine of the present invention features a novel meat stripping mechanism cooperating with the conveyance of poultry legs by suspension hooks being moved along an upwardly inclined portion of a conveyor chain. The meat is thereby pulled from the legs by engagement between stripping bars which temporarily release the legs in order to permit passage therebetween of the knuckle joint. The action of the stripping mechanism is thereby operative to effectively remove the meat from the leg bone in one piece yet permitting the tendons and ligaments which surround the leg joint to remain attached and thereby eliminate almost completely the source of undesirable materials in the final product. The machine also includes facilities for removing any additional meat which may still cling to the leg bones after passing the stripping mechanism so as to avoid any unnecessary loss of meat. Also, facilities are provided for chilling the large pieces of meat removed by the stripping mechanism in order to reduce the build-up of bacterial flora.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the apparatus illustrated in FIGURE 1.

FIGURE 3 is an end view of the apparatus as viewed from the loading end.

FIGURE 4 is an end view of the apparatus as viewed from the delivery end.

FIGURE 5 is a partial side sectional view through the apparatus taken substantially through a plane indicated by section line 5—5 in FIGURE 1.

FIGURE 7 is a transverse sectional view through the apparatus taken substantially through a plane indicated by section line 7—7 in FIGURE 5.

FIGURE 8 is a transverse sectional view taken substantially through a plane indicated by section line 8—8 in FIGURE 5.

FIGURE 9 is a partial sectional view taken substantially through a plane indicated by section line 9—9 in FIGURE 5.

FIGURE 10 is an enlarged partial sectional view showing the stripping mechanism portion of the apparatus as illustrated in FIGURE 5, in another phase position.

FIGURE 11 is a partial sectional view taken substantially through a plane indicated by section line 11—11 in FIGURE 10.

FIGURE 12 is a partial sectional view taken substantially through a plane indicated by section line 12—12 in FIGURE 11.

FIGURE 13 is a perspective view of a portion of the apparatus illustrating the bone ejection device.

Figure 1:
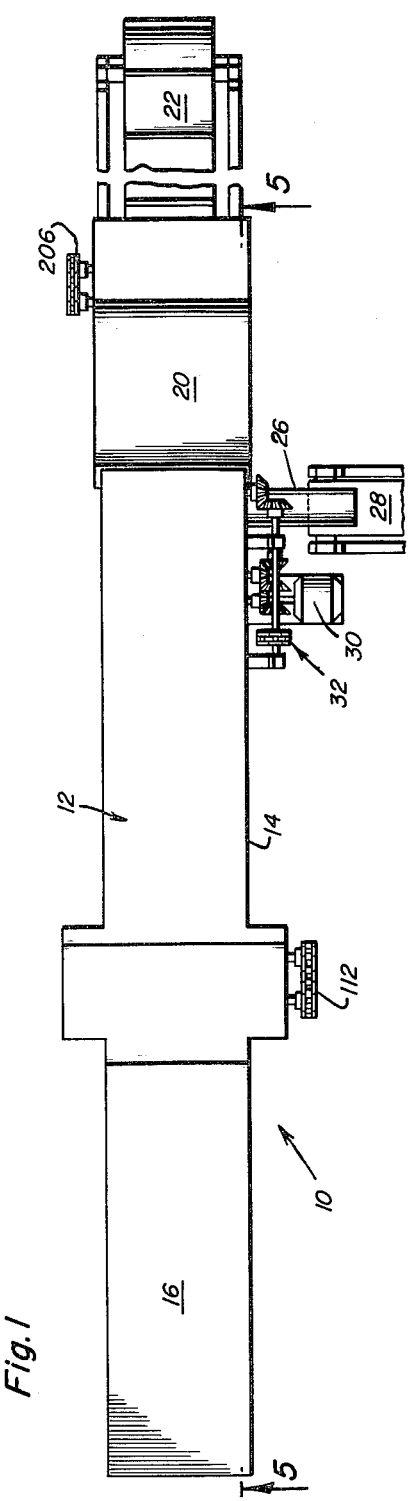
FIGURE 1 is a top plan view of the apparatus of the present invention.

Referring now to the drawings in detail and initially to FIGURES 1, 2, 3 and 4, it will be observed that the machine of the present invention generally denoted by reference numeral 10 is enclosed within an elongated housing 12 which is supported by a framework of suitable construction by means of which the various components of the machine are also supported in operative relation to each other. The housing includes an intermediate portion 14 connected on one side to a conveyor loading portion 16 located above a loading table 18. The other side of the intermediate portion 14 of the housing is connected to a delivery portion 20 from which a delivery conveyor belt 22 extends entrained about the end pulley 24. The product processed by the machine 10 is therefore delivered by the delivery belt 22. Leg bones ejected by the machine after complete removal of meat therefrom, may be delivered from the side of the intermediate portion 14 of the housing by means of the chute 26 extending therefrom for deposit of such leg bones onto conveyor 28 or any other waste removal mechanism. Also associated with the machine and mounted in any suitable location, is a prime mover such as the electric motor 30 drivingly connected to the various driven components of the machine through any suitable drive mechanism 32.

Figure 6:
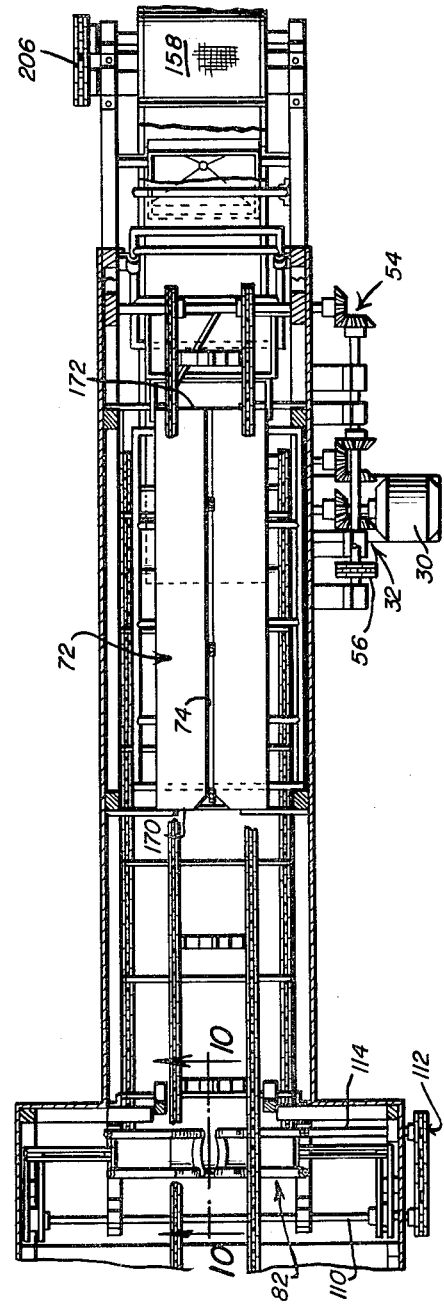
FIGURE 6 is a top sectional view through the apparatus taken substantially through a plane indicated by section line 6—6 of FIGURE 5.

Referring now to FIGURES 5 through 9 and 13 in particular, it will be observed that a pair of laterally spaced, endless conveyor chains 34 are provided, said conveyor chains being interconnected by a plurality of spaced suspension hook assemblies 36. The conveyor chains 34 are entrained about an end sprocket wheel 38 at the loading end of the machine within the housing portion 16 and about an end sprocket wheel 40 within the upper right hand portion of the intermediate housing portion 14 as viewed in FIGURE 5. The section of the conveyor chains 34 movable through the loading zone 42 within the housing portion 16 is substantially horizontal and vertically spaced below the substantially horizontal section of the conveyor chains which move through the meat cooling zone 44 within the intermediate portion 14 of the housing. The horizontal sections of the conveyor chains are interconnected by an inclined section disposed substantially at 45 degrees to the horizontal. Accordingly, the lower run of the endless conveyor chains are entrained about the lower idler sprockets 46 and 48 while the upper run of the endless conveyor chains are entrained about the idler sprockets 50 and 52. The lower run of the conveyor chains are therefore continuously moved from the loading end of the machine through the loading zone 42 from the end sprocket wheel 38 toward the end sprocket wheel 40. Movement may therefore be imparted to the conveyor chains by means of the end sprocket wheel 40 drivingly connected through beveled gearing 54 and the endless drive chain 56 of the drive mechanism 32, to the motor 30 as more clearly seen in FIGURE 2.

As the lower run of the conveyor chains 34 move through the loading zone 42, cooked poultry leg portions 58 placed on the loading table 18, may be placed on the hook assemblies 36. The suspension hook assemblies 36 therefore project from the lower run of the conveyor chains as they pass through the loading zone 42. Each suspension hook assembly as more clearly seen in FIGURE 13 includes a pair of stainless steel pivot elements 60 secured to opposed links on the conveyor chains 34 and interconnected by the pivot pin 62 from which a stainless steel hook element 64 is pivotally suspended. The hook element 64 includes a pair of fork portions 66 having a converging slot within which the foot joint 68 of the poultry leg portion 58 is received. The poultry leg portions suspended from the lower run of the conveyor chains by the hook assemblies are therefore carried at an upward incline through the stripping mechanism 70 as illustrated in FIGURE 5. Most of the meat is therefore removed from the leg bone before it is carried along the upper horizontal section through a meat removal chamber device generally referred to by reference numeral 72. The chamber device therefore is provided on the top surface thereof with a slot 74 as more clearly seen in FIGURES 6 and 9 through which the hook assembly moves as it carries the meat stripped leg bone. After leaving the meat removal chamber device 72, the leg bone is displaced from the converging slot of the hook element 64 by a bone ejection device 76 fixedly mounted adjacent to and below the end sprocket 40 as more clearly seen in FIGURE 5. The bone ejection device therefore includes a laterally inclined bar portion 78 over which the fork portions 66 of the hook element 64 pass so that the bar 78 may cam the leg portion in a lateral direction off the hook assembly. Located below the bone ejection device 76 within the housing portion 14, is the inlet portion 80 of the waste chute 26 which extends laterally out of the housing portion as aforementioned in order to deposit the leg bones onto the removal conveyor 28. Thus after the meat stripped leg bones are ejected, the empty hook assemblies will be moved by the upper run of the conveyor chains toward the loading end of the machine in a suspended condition prepared for loading by cooked poultry leg portions once again.

The removal of the meat from the cooked poultry leg bone portions 58 is effected by the stripping mechanism 70 while the leg bone is moving along the upwardly inclined section of the conveyor chains as aforementioned. As more clearly seen in FIGURES 5, 7 and 10 through 12, the stripping mechanism includes a pair of cooperating stripper assemblies 82 disposed on opposite lateral sides of the suspension hook assemblies passing therebetween for engagement with the leg portions beginning with the upper end thereof adjacent to the leg joint 68 just below the fork portions 66 of the hook element 64. Each stripper assembly 82 includes parallel spaced tubular portions 84 interconnected by a plate portion 86. Slidably mounted within the tubular portions 84, are rod elements 88 which are interconnected at the lower projecting ends by a stripper bar 90. Spring elements 92 downwardly bias the stripper bar 90 into engagement with one side of the leg bone portion as it moves upwardly along the inclined section of the conveyor chains. The stripper assemblies 82 are therefore mounted in converging relation to each other at the upper ends of lever elements 94 about fixedly mounted pivot pins 96. Each lever element 94 is provided with an arm 98 connected by a link 100 to an actuating lever 102 pivotally mounted about a fixed pivot 104. A follower roller 106 is mounted adjacent one end of each of the actuating levers 102 for engagement by the cams 108 secured to the cam shaft 110. The cams 108 may therefore be driven by the cam shaft 110 in timed relation to movement of the conveyor chains 34 by a sprocket chain drive connection 112 which drivingly connects the cam shaft 110 with the drive shaft 114 driven by the drive mechanism 32 through bevel gearing 116 drivingly connected to the endless sprocket chain 56 as will hereafter be further explained. The cams 108 are therefore operative to intermittently displace the stripper assemblies 82 against the bias of the spring elements 92 from the covering positions thereof so as to receive between the stripping bars 90, the upper end portion of the leg just below the leg joint 68 as it is carried upwardly along the inclined section of the conveyor chains by the suspension hook assembly 36. The stripper bars 90 will therefore be effective to gently engage and accumulate meat from the leg bone. As the knuckle joint 118 of the leg bone approaches the stripping bars, the cams 108 will pivotally displace the stripper assemblies 82 so as to release the leg bone until the knuckle joint 118 passes thereby. The stripper assemblies then re-engage the leg below the knuckle joint so as to complete removal of the meat from the bones. Release of the leg as the knuckle joint passes between the stripper bars 90, as illustrated in FIGURES 10 and 11, will avoid breaking or splintering of the leg bone. Also, the action of the stripper assemblies on the leg bone as it passes upwardly at an inclined angle of approximately 45° will permit removal of a larger single piece of meat from the leg bone without tendons or ligaments. The meat so removed by the stripping mechanism will fall downwardly therefrom and pass into meat chilling apparatus generally referred to by reference numeral 120 located within the intermediate portion 14 of the housing.

The meat chilling apparatus 120 includes vertically spaced, horizontal troughs 122, 124 and 126. The upper trough 122 is provided with an inlet end 128 disposed below the stripping mechanism 70 so as to receive the stripped meat therein. The outlet end 130 of the upper trough 122 is disposed above the inlet end 132 of the trough 124 which in turn has an outlet end 134 disposed just above the inlet end 136 of the lower trough 126. The bottoms of the troughs adjacent the outlet ends are inclined upwardly so that meat moved therealong may spill over into the inlet end of a lower trough. Each of the troughs therefore has associated therewith an endless belt 138 carrying spaced, flexible rake elements 140 which move along the bottom of the troughs from the inlet to the outlet ends in order to displace the stripped meat through a chilled brine solution or other suitable cooling medium circulated through the troughs. The rake carrying belts 138 associated with each of the troughs is therefore driven in the proper direction by means of the bevel gears assemblies 116, 142 and 144 which are all drivingly connected to the drive chain belt 56. The opposite ends of the rake belts 138 are therefore entrained about drive pulleys with the drive pulleys at the right end of the belts as viewed in FIGURE 5, being connected to the bevel gear assemblies 116, 142 and 144. The pulley at the left end of the upper rake belt 138 may also be connected by the shaft 114 to the chain belt drive 112 aforementioned so as to impart rotation to the cam shaft 110.

Provided at the bottom of the intermediate housing portion 14 is a reservoir tank 146 containing a fluid coolant such as the brine solution 148 chilled by means of the cooling coils 150 connected to suitable refrigerating apparatus. A circulating pump 152 driven by motor 154 is therefore provided, having an inlet connected to the tank 146 and a discharge line 156 connected to the troughs 122, 124 and 126 for supply of the chilled brine thereto. It will therefore be apparent, that the stripped meat deposited into the upper trough 122 will be moved through the brine solution by the rake elements 140 spilling over therewith into the trough 124 and then into the trough 126. Prolonged passage of the stripped meat through the brine solution is thereby effective to cool the meat from approximately 160° F. to 70° F. within 90 seconds after removal. This reduces the possibility of bacterial contamination. The chilled meat and brine solution finally spill over the outlet end of the lower trough 126 for deposit on the upper run of a perforated conveyor belt 158.

The perforated conveyor belt is entrained about a drive pulley wheel 160 at its lower end to which the motor shaft 162 is connected. The upper end of the conveyor belt is entrained about the idler pulley wheel 163 so as to upwardly convey the meat deposited thereon along the upper run. Meat received from the outlet end of the lower trough 126 with the brine solution will be located above a drain basin 164 so that the brine solution may drain back into the tank 146 through the return conduit 166. Also, deposited on the perforated conveyor belt above the drain basin 164, for mixing with the stripped meat chilled by the cooling apparatus 120, are additional scraps of meat removed from the leg bones within the chamber device 72 aforementioned. Referring therefore to FIGURES 5, 8 and 9, it will be observed that the chamber device includes a bottom wall 168 inclined downwardly from the inlet end 170 through which the leg bones enter toward the outlet end 172 through which the meat stripped bones emerge, for subsequent ejection by the ejection device 76. A downwardly extending delivery chute 174 is therefore connected to the outlet end 172 of the chamber device for deposit of meat scraps onto the perforated conveyor belt 158. Connected to the side walls 176 of the chamber device and projecting thereinto, are a plurality of pressure jet nozzles 178 connected to the pressure discharge line 180 of the pump mechanism 182 driven by motor 184. It will therefore be apparent, that any remaining meat on the previously stripped leg bones passing through the chamber device 72, will be removed by the high pressure jet sprays from the nozzle devices 178 and wash downwardly along the bottom wall 168 of the chamber device for deposit by the delivery chute 174 onto the perforated conveyor belt 158.

After the stripped meat is drained of the brine solution, it passes upwardly below a rinsing spray head 186 connected by line 188 to the discharge line 180 of the pump mechanism 182. Any remaining brine on the meat is thereby washed by the rinse liquid draining through the perforated belt into the drain basin 190 from which the rinse water is conducted by the drain conduit 192. The meat then passes below an air pressure discharge head 194 connected to an air compressor 196 driven by the motor 198 which may also drive a suction pump 200. The suction pump 200 is connected to a suction device 202 located below the perforated belt in alignment with the air pressure discharge head 194 so as to cooperate therewith in drying the meat of liquid. Thus, the stripped meat is conditioned along the upper run of the perforated belt 158 before it is deposited from the upper end of the perforated belt 158 onto the delivery belt 22. The delivery belt may therefore be driven by its end pulley wheel 204 drivingly connected by drive belt 206 to the pulley wheel 164 of the perforated belt 158. Accordingly, the delivery belt 122 extends out of the housing portion 20 into which the upper outlet end of the perforated belt 158 extends.

From the foregoing description, the construction, operation and utility of the poultry leg boning machine will be apparent. It will therefore be appreciated, that the machine of the present invention when loaded with cooked poultry legs, will automatically remove the meat therefrom in such a manner as to deliver large bulk pieces after they have been chilled and conditioned for removal of the cooling medium. A better appearing and commercially more valuable product is thereby achieved. Also, in view of the novel stripping action of the stripping mechanism, the meat product will not include any bone fragments or other undesirable materials so as to enhance the quality of the final product. Also, in view of the speed and automatic operation of the machine as well as the provision of the fluid jet chamber device for removal of remaining pieces of meat on the leg bones, the meat removal operation is rendered significantly more economical. Also, the arrangement of the components within the machine including the disposition of the conveyor chains as the top of the machine for movement of the suspension hook assemblies, makes for a more efficient meat removal operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a machine for boning poultry legs having an intermediate knuckle joint, the combination of a suspension hook pivotally carried by a conveyor for movement in an upwardly inclined path and a stripping mechanism for removing meat from the leg carried by the hook comprising, a pair of pivotally mounted members between which the suspension hook passes along said upwardly inclined path, a pair of opposite strip bars yieldably mounted by the members for engagement with the leg during a stripping operation, and cam-operated means operative in timed relation to movement of the conveyor for temporarily displacing the members away from each other to release the leg bone during said stripping operation permitting passage of the knuckle joint between the strip bars.

2. A machine for removing the meat of a cooked poultry leg from the leg bone having a knuckle joint comprising a frame, means including opposed stripping bars yieldably mounted by said frame in a substantially fixed position for continuous engagement with a poultry leg passing therefrom during a stripping operation, displacement means operable to cause relative displacement of said stripping bars to dispose them in a release position during said stripping operation to permit the knuckle joint to pass therebetween, conveyor means mounted on said frame including a leg-carrying element movable between said stripping bars for engagement of said poultry leg therebelow during the stripping operation and control means connected to said displacing means for temporarily disposing the stripping bars in said release position during the stripping operation to prevent breakage of the leg bone at the knuckle joint.

3. In a machine for removing meat of a poultry leg from a leg bone having a knuckle joint, means for conveying a poultry leg along a predetermined path, stripping means including a pair of oppositely disposed resiliently mounted stripping bars engageable with said leg while being conveyed along said path for removing meat therefrom, and means operative during movement of the leg along said path for momentarily causing relative movement of the stripping bars away from one another to permit passage of the knuckle joint through the stripping bars.

4. A machine for removing the meat of a cooked poultry member from the bone having a knuckle joint comprising a frame, means for moving the member along a predetermined path, a pair of stripping bars disposed on opposite sides of said path engageable with the member to remove meat therefrom, at least one of said stripping bars being resiliently mounted, and means for effecting relative displacement of said stripping bars to permit the knuckle joint to pass therethrough during the stripping operation.

5. A machine for removing the meat of a cooked poultry member from the bone having a knuckle joint, comprising a frame, means for moving the member along a predetermined path, a pair of stripping bars disposed on opposite sides of said path engageable with the member to remove meat therefrom, means resiliently mounting both of said stripping bars, and means for effecting relative displacement of said stripping bars to permit the knuckle joint to pass therethrough during the stripping operation.

6. A machine for removing the meat of a cooked poultry member from the bone having a knuckle joint comprising a frame, means for moving the member along a predetermined path, a pair of stripping bars disposed on opposite sides of said path engageable with the member to remove meat therefrom, at least one of said stripping bars being resiliently mounted, and means for effecting displacement of at least one of said stripping bars transversely relative to the path of movement of the member to permit knuckle joint to pass therethrough during the stripping operation.

7. A machine for removing the meat of a cooked poultry member from the bone having a knuckle joint comprising a frame, means for moving the member along a predetermined path, a pair of stripping bars disposed on opposite sides of said path engageable with the member to remove meat therefrom, at least one of said stripping bars being resiliently mounted, and displacement means for effecting displacement of said stripping bars away from each other in a direction transverse to the path of movement of the members to permit the knuckle joint to pass therethrough during the stripping operation.

8. A system for removing the meat of a cooked poultry member from the bone having a knuckle joint comprising a conveyor mounted for movement along a predetermined path having a plurality of spaced apart hooks carried by the conveyor and disposed along said path, a feed station for suspending a poultry member from each of the hooks, a stripping station downstream of said feed station for removing meat from the member consisting of a pair of stripping bars disposed on opposite sides of said path, at least one of said stripping bars being resiliently mounted, and means for effecting relative displacement of the stripping bars to permit the knuckle joint to pass therethrough during the stripping operation.

9. A system for removing the meat of a cooked poultry member from the bone having a knuckle joint comprising a conveyor mounted for movement along a predetermined path having a plurality of spaced apart hooks carried by the conveyor and disposed along said path, a feed station for suspending a poultry member from each of the hooks, a stripping station downstream of said feed station for removing meat from the member consisting of a pair of stripping bars disposed on opposite sides of said path, at least one of said stripping bars being resiliently mounted, means for effecting relative displacement of the stripping bars to permit the knuckle joint to pass therethrough during the stripping operation and bone removal means downstream of said stripping station for removing the stripped bones from the hooks on the conveyor.

10. A system for removing the meat of a cooked poultry member from the bone having a knuckle joint comprising a conveyor mounted for movement along a predetermined path having a plurality of spaced apart hooks having fork portions carried by the conveyor and disposed along said path, a feed station for suspending a poultry member from each of the hooks, a stripping station downstream of said feed station for removing meat from the member consisting of a pair of stripping bars disposed on opposite sides of said path, at least one of said stripping bars being resiliently mounted, and means for effecting relative displacement of the stripping bars to permit the knuckle joint to pass therethrough during the stripping operation and bone removal means downstream of said stripping station comprising a laterally inclined bar portion over which the fork portion of the hook passes whereby the bar member cams the leg bone in a lateral direction to remove it from the hook thereby to remove the stripped bones from the conveyor.

11. A system as claimed in claim 10 including collection means, a second conveyor communicating with the bone removal means for conveying the stripped bones to a discharge point.

References Cited by the Examiner

UNITED STATES PATENTS

| | | | |
|---|---|---|---|
| 2,840,849 | 7/1958 | Bergstrom et al. | 17—1 |
| 2,851,362 | 9/1958 | Goldberg | 99—107 |
| 2,858,222 | 10/1958 | Harris et al. | 99—107 |
| 2,897,536 | 8/1959 | Bergstrom et al. | 17—1 |
| 3,017,661 | 1/1962 | Zartman | 17—45 |
| 3,121,252 | 2/1964 | Zartman | 17—1 |
| 3,154,805 | 11/1964 | Egee et al. | 17—1 |

SAMUEL KOREN, *Primary Examiner.*

LUCIE H. LAUDENSLAGER, MELVIN D. REIN,
*Examiners.*